United States Patent
Gomes-Casseres et al.

(10) Patent No.: US 9,729,211 B2
(45) Date of Patent: Aug. 8, 2017

(54) PROXIMITY BASED WIRELESS AUDIO CONNECTION

(71) Applicant: Bose Corporation, Framingham, MA (US)

(72) Inventors: Glenn Gomes-Casseres, Newton, MA (US); Pelham Norville, Framingham, MA (US)

( * ) Notice: Subject to any disclaimer, the term of this patent is extended or adjusted under 35 U.S.C. 154(b) by 712 days.

(21) Appl. No.: 13/680,405

(22) Filed: Nov. 19, 2012

(65) Prior Publication Data

US 2014/0140530 A1    May 22, 2014

(51) Int. Cl.
| | |
|---|---|
| *H04B 3/00* | (2006.01) |
| *H04H 20/48* | (2008.01) |
| *H04H 40/00* | (2009.01) |
| *H04B 7/00* | (2006.01) |
| *H04W 4/00* | (2009.01) |
| *H04W 4/02* | (2009.01) |

(52) U.S. Cl.
CPC .............. *H04B 7/00* (2013.01); *H04W 4/001* (2013.01); *H04W 4/023* (2013.01)

(58) Field of Classification Search
CPC ............ H04R 27/00; H03G 1/02; H04B 7/00; H04W 4/001; H04W 4/023
USPC ......... 381/77, 105, 124, 59, 57, 16, 14, 104, 381/332, 6; 455/3.06, 41.3, 194.2
See application file for complete search history.

(56) References Cited

U.S. PATENT DOCUMENTS

| | | | |
|---|---|---|---|
| 7,092,022 B1 | 8/2006 | Brake | |
| 7,142,814 B2 | 11/2006 | Nassimi | |
| 8,055,197 B2* | 11/2011 | Lyu | H04B 17/27 455/41.2 |
| 2004/0209655 A1 | 10/2004 | Kubo | |
| 2005/0255895 A1* | 11/2005 | Lee | G06F 1/1632 455/573 |
| 2006/0009117 A1* | 1/2006 | Severson | A63H 19/14 446/410 |
| 2007/0197164 A1 | 8/2007 | Sheynman et al. | |
| 2008/0140868 A1 | 6/2008 | Kalayjian et al. | |
| 2008/0227393 A1 | 9/2008 | Tang et al. | |

(Continued)

FOREIGN PATENT DOCUMENTS

| | | |
|---|---|---|
| EP | 1833232 A2 | 9/2007 |
| WO | 2007124122 A2 | 11/2007 |

OTHER PUBLICATIONS

International Search Report and Written Opinion mailed Mar. 19, 2014 for corresponding PCT Application No. PCT/US/2013/070569.

*Primary Examiner* — William A Jerez Lora
(74) *Attorney, Agent, or Firm* — Brian M. Dingman; Dingman IP Law, PC (57) ABSTRACT

A base device for a portable source device includes an output device and a proximity sensor configured (i) to receive a proximity signal associated with the portable source device when the portable source device is disposed in proximity thereto and (ii) to generate a proximity event notification in response to receiving the proximity signal. The base device includes a controller disposed in electrical communication with the proximity sensor and configured to, in response to receiving the proximity event notification from the proximity sensor, transmit a command signal to the portable source device. The command signal is operable to configure the portable source device to automatically send content to the output device via a wireless communication link.

25 Claims, 4 Drawing Sheets

(56) References Cited

U.S. PATENT DOCUMENTS

| | | | |
|---|---|---|---|
| 2009/0147507 A1* | 6/2009 | Verfuerth | F21V 15/01 |
| | | | 362/221 |
| 2009/0164688 A1 | 6/2009 | Wright-Riley | |
| 2010/0020983 A1 | 1/2010 | Waites | |
| 2010/0046766 A1* | 2/2010 | Gregg | H04R 3/12 |
| | | | 381/59 |
| 2010/0057233 A1* | 3/2010 | Suzuki | H04W 52/0241 |
| | | | 700/94 |
| 2010/0118144 A1* | 5/2010 | Fawcett | G08B 13/1445 |
| | | | 348/143 |
| 2010/0255784 A1* | 10/2010 | Ido | H04N 1/00244 |
| | | | 455/41.2 |
| 2011/0059736 A1 | 3/2011 | Norrman et al. | |
| 2011/0253693 A1* | 10/2011 | Lyons | A47J 27/00 |
| | | | 219/209 |
| 2011/0313922 A1 | 12/2011 | Ben Ayed | |
| 2012/0128172 A1* | 5/2012 | Alden | H04L 63/0492 |
| | | | 381/77 |
| 2012/0203078 A1* | 8/2012 | Sze | G06F 19/3418 |
| | | | 600/301 |
| 2012/0289160 A1* | 11/2012 | Palin | H04W 48/14 |
| | | | 455/41.2 |

\* cited by examiner

PROXIMITY BASED WIRELESS AUDIO CONNECTION

BACKGROUND

Conventional digital portable media players are configured to store relatively large volumes of content, such as music and image files, as well as play music, stream music and/or other content, and display both still and moving images. The portable nature of these media players often means that compromises must be made in supporting direct use of these devices to engage in audio/visual tasks. For example, headphones and video displays associated with the devices are typically small in size, which renders the devices less capable of reproducing audio or video imagery of a quality that would be achievable were size for the sake of portability not a concern.

At certain times, a user of a portable media player may wish to remain in one place for some period of time while enjoying higher quality audio and/or video content. In such a case, the user can physically connect the media player to a docking interface of a base device to allow the base device to support higher quality audio and/or video in audio/visual tasks. In another case, the user may connect wirelessly to the base device. These conventional base devices are commonly far larger, and therefore, far less portable than the personal portable devices with which they are capable of docking. This enables the base devices to utilize relatively larger components, such as speakers and video displays that are capable of reproducing higher quality audio and/or video imagery.

SUMMARY

In one aspect, arrangements of the innovation relate to a base device for a portable source device, such as a portable audio source device. The base device can include an output device, such as an audio output device and/or a video output device, a proximity sensor configured (i) to receive a proximity signal associated with the portable source device when the portable source device is disposed in proximity thereto and (ii) to generate a proximity event notification in response to receiving the proximity signal, and a controller disposed in electrical communication with the proximity sensor. The controller is configured to, in response to receiving the proximity event notification from the proximity sensor, transmit a command signal to the portable source device, the command signal operable to configure the portable source device to automatically send a content signal, such as an audio signal and/or a video signal to the output device via a wireless communication link.

Embodiments of the present innovation relate to a base device for a portable source device that includes an output device, a proximity sensor configured (i) to receive a proximity signal associated with the portable source device when the portable source device is disposed in proximity thereto and (ii) to generate a proximity event notification in response to receiving the proximity signal, and a controller disposed in electrical communication with the proximity sensor, the controller configured to, in response to receiving the proximity event notification from the proximity sensor, transmit a command signal to the portable source device, the command signal operable to configure the portable source device to automatically send a content signal to the output device via a wireless communication link.

Various additional implementations may include one or more of the following features. For example the command signal is further operable to configure the portable source device to automatically establish the wireless communication link with the base device. The controller can further include a radio device disposed in electrical communication with the output device, the radio device configured to establish the wireless communication link between the output device and the portable source device. The radio device can be configured to automatically establish a Bluetooth communication link between the output device and the portable source device. The radio device can be configured to automatically establish Wi-Fi communication as the wireless communication link between the output device and the portable source device.

The proximity sensor can be configured to detect a proximity signal criterion of the proximity signal when the portable source device is disposed in proximity thereto. The proximity sensor can be configured (i) to receive a first proximity signal associated with a first portable source device when the first portable source device is disposed in proximity thereto and to receive a second proximity signal associated with a second portable source device when the second portable source device is disposed in proximity thereto and (ii) to generate a proximity event notification associated with a single portable audio source of the first portable source device and the second portable source device based upon one of the first proximity signal and the second proximity signal. In response to receiving the first proximity signal and the second proximity signal, the proximity sensor can be configured to compare a signal strength value associated with the first proximity signal with a signal strength value associated with the second proximity signal to detect one of the first portable audio source and the second portable audio source as being in relatively closer proximity to the base device and generate the proximity event notification for the controller to establish connection with the relatively closer portable audio source. In response to receiving the first proximity signal and the second proximity signal, the proximity sensor can be configured to detect a device identifier of a first portable audio source based upon the first proximity signal and detect a device identifier of a second portable audio source based upon the second proximity signal and generate the proximity event notification for the controller to establish connection with one of the first portable audio source and the second portable audio source based upon the detected identity of the first portable audio source and the detected identity of the second portable audio source. The proximity sensor can include at least one proximity sensor selected from the group consisting of a physical switch, a pressure sensor, an infrared (IR) sensor, a weight sensor, a near field communication (NFC) mechanism, a radio frequency identification (RFID) mechanism, and a signal strength detector.

The output device can be configured as an electrical output device or as an acoustic output device. The proximity sensor can be configured to detect an absence of the proximity signal associated with the portable source device when the portable source device is removed from proximity thereto and in response to detecting the absence of the proximity signal, transmit a command to the controller to maintain the wireless communication link with the portable source device. The proximity sensor can be configured to detect an absence of the proximity signal associated with the portable source device when the portable source device is removed from proximity thereto and in response to detecting the absence of the proximity signal, transmit a command to the controller to terminate the wireless communication link with the portable source device.

The base device can further include an enclosure configured to contain the output device, proximity sensor, and controller. The base device can also include a stand associated with the enclosure, the stand configured to physically support the portable source device. The enclosure can further include a charging apparatus configured to charge the portable audio device when disposed in proximity thereto.

In general, one aspect of the disclosure features a base device for a portable audio source device that includes an enclosure, an audio output device located within the enclosure, a radio device located within the enclosure and disposed in electrical communication with the audio output device, the radio device configured to establish a wireless communication link between the audio output device and the portable audio source device, a proximity sensor located within the enclosure, the proximity sensor configured (i) to receive a proximity signal associated with the portable audio source device when the portable audio source device is disposed in proximity thereto and (ii) to generate a proximity event notification in response to receiving the proximity signal, and a controller located within the enclosure and disposed in electrical communication with the proximity sensor, the controller configured to, in response to receiving the proximity event notification from the proximity sensor, transmit a command signal to the portable audio source device, the command signal operable to configure the portable audio source device to automatically send an audio signal to the audio output device via the wireless communication link.

In general, one aspect of the disclosure features, in a base device, a method for outputting a content signal from a portable source device. The method includes receiving, by the base device, a proximity signal associated with the portable source device when the portable source device is disposed in proximity thereto, detecting, by the base device, a proximity event notification in response to receiving the proximity signal, and in response to detecting the proximity event notification, transmitting, by the base device, a command signal to the portable source device, the command signal operable to configure the portable source device to automatically send the content signal to the base device via a wireless communication link.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale with emphasis instead being placed upon illustrating the principles of various embodiments of the innovation.

DETAILED DESCRIPTION

A conventional base system, such as an amplifier and speaker system, includes a docking port configured to physically and electrically couple with a corresponding port on a conventional portable media player, such as an iPad™. Interconnection of the docking port of the base system with that of the player allows the base system to receive and output audio from the portable media player. However, physical docking ports can include a number of interconnection pins, such as up to thirty pins for the iPad™. A user can experience difficulty in aligning and coupling the port on the portable media player with the port on the base system. Additionally, wireless coupling of the base system and the portable media player, such as using Bluetooth, requires a user to execute a series of button presses on both the base system and media player to establish a communication link. This process can be time consuming and cumbersome to the user.

Embodiments of the present innovation relate to a base device configured to form a wireless audio connection with a portable source device based upon the device's proximity. For example, the base device includes a proximity sensor configured to detect the presence of the portable audio source relative to the base device. In response to the detection, the base device creates a wireless connection with the portable audio device, such as using Bluetooth, and output a content signal, such as an audio signal and/or a video signal received from the portable audio device via the connection. Accordingly, the configuration of the base device simplifies connection with the portable source device by minimizing or eliminating the necessity for physical connections, such as docking ports, or the necessity for a series of button presses on the devices to establish a communication link.

In one arrangement, the base device is configured to terminate the wireless connection in response to a user moving the portable audio device out of proximity from the base device and cease outputting audio from the player. In another arrangement, the base device is configured to maintain the wireless connection in response to a user moving the portable audio device out of proximity from the base device and continue outputting audio it receives from the portable audio device.

Figure 1:
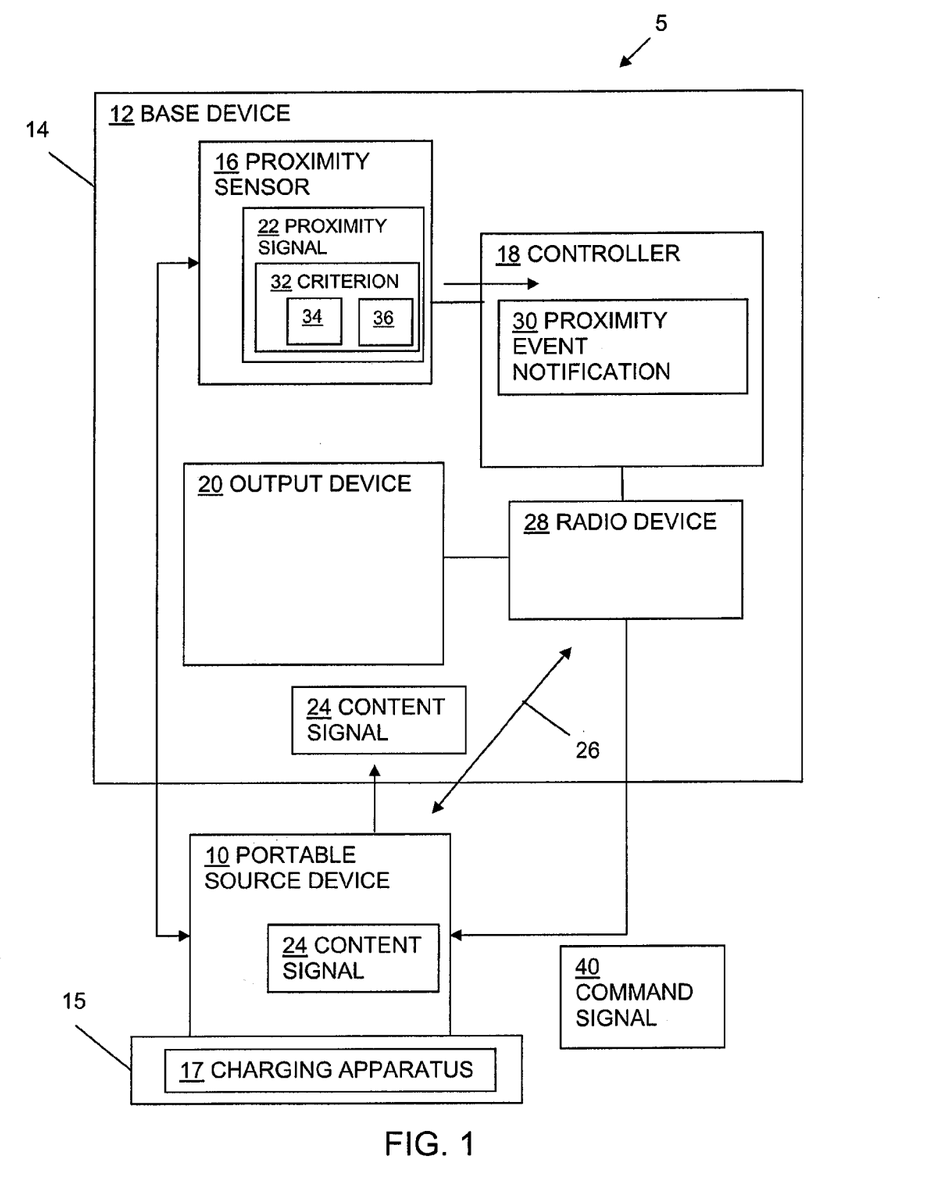
FIG. 1 illustrates a schematic representation of a base device for a portable source device, according to one arrangement.

FIG. 1 illustrates a schematic representation of an audio system 5 that includes a portable source device 10 and a base device 12. The portable source device 10 and base device 12 are configured to operate in conjunction with each other to provide content, such as audio and/or video content, to an end user. For example, as will be described in detail below, the base device 12 is configured to receive a content signal, such as an audio signal, a video signal, or other data signal from the portable source device 10 via a wireless transmission and can output the content signal as sound for the end user. In such an arrangement, the portable source device 10 can be a computerized audio device, such as an iPod™, as a computerized tablet device, such as an iPad™, as a smartphone, such as an iPhone™, or as a laptop computer while the base device 12 can be configured as a powered speaker or docking station for the portable source device 10, for example.

While the base device 12 can include a variety of components, in one arrangement as illustrated in FIG. 1, the base device 12 includes an enclosure 14 that houses a proximity sensor 16 and an output device 20 such as an audio output device and/or a video output device, each of which are disposed in electrical communication with a controller 18, such as a processor and memory.

In one arrangement, the base device 12 is configured to support the portable source device 10. For example, the enclosure 14 of the base device 12 can include a stand 15 that holds the portable source device 10 in relatively close proximity to the proximity sensor 16. Accordingly, the stand 15 allows a user the ability to dispose the portable source device 10 at an appropriate distance from the proximity sensor 16 to allow the establishment of a wireless communication link 26 with the base device 12. In one arrangement, the stand 15 can include a charging apparatus 17 configured to charge the portable source device 10, such as through inductive charging, when placed in proximity thereto.

As indicated above, the base device 12 is configured to form a wireless audio connection with the portable source device 10 based upon the device's proximity to the base station 12. In one arrangement, the proximity sensor 16 is configured to detect that the portable source device 10 is disposed in close proximity relative to the base device 12 (e.g., either touching or disposed within inches of the base device 12) based upon receipt of a proximity signal 22.

For example, the proximity sensor 16 can be configured as a controller (e.g., a processor and memory) utilized in conjunction with an electromechanical device, such as physical switch, a pressure sensor, a photocell, a Hall-effect transducer, or a weight sensor that receives the proximity signal 22 in response to a user's action. Accordingly, when the user places the portable source device 10 in close proximity to the base device 12, either the user or the portable source device 10 can physically actuate the proximity sensor 16, generate and send the signal 22. In another example, the proximity sensor 16 can be configured as an electrical device, such as an infrared (IR) sensor, a near field communication (NFC) mechanism, a radio frequency identification (RFID) mechanism or a signal strength detector (e.g., a Wi-Fi signal strength detector or a Bluetooth signal strength detector) configured to receive the proximity signal 22 as a transmission from the portable source device 10. Accordingly, when the user places the portable source device 10 in close proximity to the base device 12, as the portable source device 10 transmits the proximity signal 22 to the base device 12, the proximity sensor 16 receives the proximity signal 22 via wireless communication.

The controller 18, in response to the proximity sensor 16 detecting the proximity of the portable source device 10, is configured to initiate communication with the portable source device 10 and to direct the portable source device 10 to automatically send a content signal 24 to the output device 20 via a wireless communication link 26. For example, the controller 18 includes a radio device or transceiver 28 configured to communicate via a wireless communication protocol with the portable source device 10 to establish the wireless communication link 26, such as a Bluetooth communication link or a Wi-Fi communication link (i.e., where the Wi-Fi communication link can be established between the radio device 28 and the source device 10 through communications device, such as a router). As will be described in detail below, once established, the portable source device 10 can provide a content signal 24 to the radio device 28 via the wireless communication link 26. The radio device 28, in turn, provides the content signal 24 to the output device 20 for delivery to the end user. While the output device 20 can be configured in a variety of ways, in one arrangement, the output device 20 is configured as an acoustic output device, such as an electroacoustic transducer. Alternately, the output device 20 is configured as an electrical output device, such as a Universal Serial Bus (USB) port or 3.5 mm auxiliary output.

Figure 2:
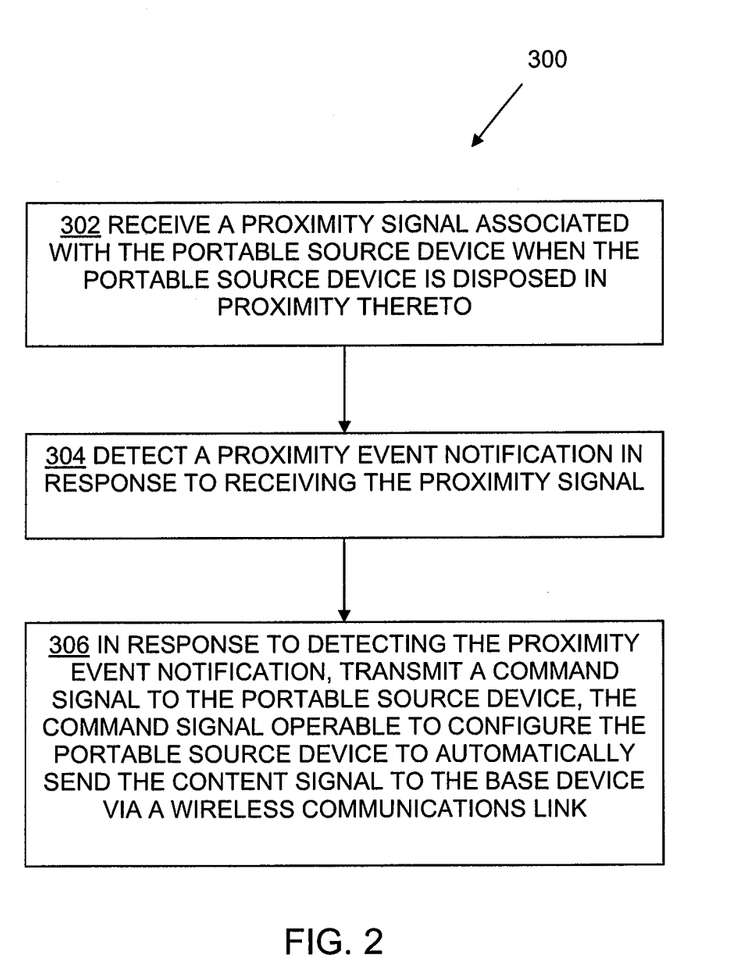
FIG. 2 is a flowchart illustrating a process conducted by the base device of FIG. 1, according to one arrangement.

FIG. 2 is a flowchart 300 illustrating a process conducted by the base device 12 for outputting a content signal 24 from a portable source device 10, according to one arrangement. For example, assume the case where the portable source device 10 provides a content signal 24 to an end user, such as an audio signal provided through a set of headphones. In the described process, as the user brings the portable source device 10 into relatively close proximity to the base device 12, the portable source device 10 establishes a wireless connection with the base device 12 and switches the output of the content signal 24 to provide the signal to the output device 20 to the base device 12.

In step 302, the base device 12 receives a proximity signal 22 associated with the portable source device 10 when the portable source device 10 is disposed in proximity thereto. In one arrangement, as indicated above, the proximity sensor 16 can be configured to receive the proximity signal 22 as a transmission, such as a wireless transmission, from the portable source device 10. For example, when a user moves the portable source device 10 within a particular range or distance from the proximity sensor 16, the proximity sensor 16 can receive the proximity signal 22. In one arrangement, the user can perform a physical action on an electromechanical device associated with the proximity sensor 16 to generate the proximity signal 22. For example, in the case where the proximity sensor 16 is configured as a pressure sensor or a weight sensor, the user can place the portable source device 10 against the sensor, thereby causing the sensor to generate and transmit the proximity signal 22 to the controller 18.

In one arrangement, the proximity signal 22 includes a device identifier 36 associated with the portable source device 10 which identifies the source of the proximity signal 22. For example, the portable source device 10 can include, as a device identifier 36, a model number, serial number or MAC Address as part of the proximity signal 22. In this arrangement, the base device 12 can utilize the device identifier 36 to identify the portable source device 10 when establishing the wireless communication channel 26.

The minimum distance between the portable source device 10 and the proximity sensor 16 which allows the proximity sensor 16 to receive the proximity signal can vary. For example, in the case where the proximity sensor 16 is configured as an electrical device and when the portable source device 10 utilizes near field communication (NFC) to transmit the proximity signal 22, the proximity range between the portable source device 10 and the proximity sensor 16 can be up to about two inches. In another example, in the case where the proximity sensor 16 is a mechanical or electromechanical device, the proximity sensor 16 can be configured as switch or Hall effect sensor.

Returning to FIG. 2, in step 304, the base device 12 detects a proximity event notification 30 in response to receiving the proximity signal 22. For example, with reference to FIG. 1, when the proximity sensor 16 receives the proximity signal 22, as associated with the portable source device 10, the proximity sensor 16 is configured to generate the proximity event notification 30 and transmit the notification 30 to the controller 18. The proximity event notification 30, in turn, drives the controller 18 to initiate the wireless communication link 26 with the portable source device 10.

In certain cases, the proximity sensor 16 can be configured to selectively transmit the proximity event notification 30 to the controller 18 based upon a proximity signal criterion 32 associated with the proximity signal 22. With such a configuration, the proximity sensor 16 can validate the portable source device 10 to either allow or deny the initiation of the wireless communication link 26 between the base device 12 and the portable source device 10.

In one arrangement, the proximity signal criterion 32 is configured as a signal strength value 34 associated with the proximity signal 22 and indicative of the relative distance between the portable source device 10 and the proximity sensor 16. In this arrangement, based on the signal strength value 34 of the proximity signal 22, the proximity sensor 16 can either generate or withhold generation of the proximity event notification 30.

For example, assume that during operation, the portable source device 10 transmits the proximity signal 22 in a substantially continuous manner. Further assume the case where the portable source device 10 is disposed at a substantial distance from the proximity sensor 16, such as a' distance greater than two inches in the case of Bluetooth communication. As the proximity sensor 16 receives the proximity signal 22, the proximity sensor 16 can detect the signal strength value 34 as being relatively small and refrain from forwarding the proximity event notification 30 to the controller 18. In another example, assume the case where the portable source device 10 is disposed in relatively close proximity to the proximity sensor 16, such as a distance less than one inch in the case of Bluetooth communication. As the proximity sensor 16 receives the proximity signal 22, the proximity sensor 16 can detect the signal strength value 34 as being relatively large and can generate and forward the proximity event notification 30 to the controller 18.

Returning to FIG. 1, in step 306, in response to detecting the proximity event notification 30, the base device 12 transmits a command signal 40 to the portable source device 10, the command signal 40 operable to configure the portable source device 10 to automatically send the content signal 24 to the base device 12 via a wireless communication link 26. For example, when the controller 18 receives the proximity event notification 30, the controller 18 directs the radio device 28 to establish the wireless communication link 26 with the portable source device 10. In response, the radio device 28 transmits the command signal 40 to the portable source device 10, as identified by the device identifier 36 of the proximity signal.

In one arrangement, the command signal 40 initiates a conventional Bluetooth connection or pairing between the portable source device 10 and the base device 12 to establish the wireless communication link 26, such as a Bluetooth communication link, between the portable source device 10 and the output device 20. For example, the command signal 40 initiates a conventional handshaking process between the base device 12 and the portable source device 10 to establish the wireless communication link 26. Alternately, in one arrangement, the command signal 40 configures the portable source device 10 to automatically establish the Bluetooth communication link 26 with the base device 12. For example, the portable source device 10 can be configured to initiate the conventional handshaking process with the base device 12 to establish the wireless communication link 26 in response to receiving the command signal 40.

In one arrangement, the command signal 40 establishes WiFi communication as the wireless communication link 26 between the portable source device 10 and the output device 20. For example, with conventional WiFi the portable source device 10 and the output device 20 are configured as a communications pair via a communications device, such as a router (not shown). As a user brings the portable source device 10 into a communication range with the base station 12, the base device 12 transmits the command signal 40, as a WiFi based command, to the portable source device 10 which causes the portable source device to select the base device 12 as a content output target device via the router.

With the wireless communication link 26 established, the portable source device 10 provides the content signal 24 to the output device 20 via the radio device 28. In turn, the output device 20 can provide the content signal 24 to an end user in the form of an acoustic signal and/or an electrical signal, based upon the configuration of the device 20. Accordingly, the configuration of the base device 12 allows automatic connection between the portable source device 10 and the output device 20 and automatic switching of the content signal 24 to the base device 12. Additionally, the configuration of the base device 12 simplifies connection with the portable source device 10 by minimizing or eliminating the necessity for physical connections, such as docking ports, or the necessity for a series of button presses on the devices to establish a communication link, such as when Bluetooth near field communication (NFC) technology is utilized to establish the wireless communication link 26.

In certain cases, more than one portable source device 10 can be brought in relatively close proximity with the base device 12 at substantially the same time. While the base device 12 can receive proximity signals 22 from each of the portable source devices 10, to minimize connections with multiple devices 10, the base device 12 can be configured to allow only one connection with a portable source audio device 10 and subsequent delivery of a content signal 24 from that source device 10. In one arrangement, base device 12 is configured to discriminate between portable source devices 10 based upon a variety of proximity signal criteria associated with the proximity signals 22 received from the devices 10.

Figure 3:
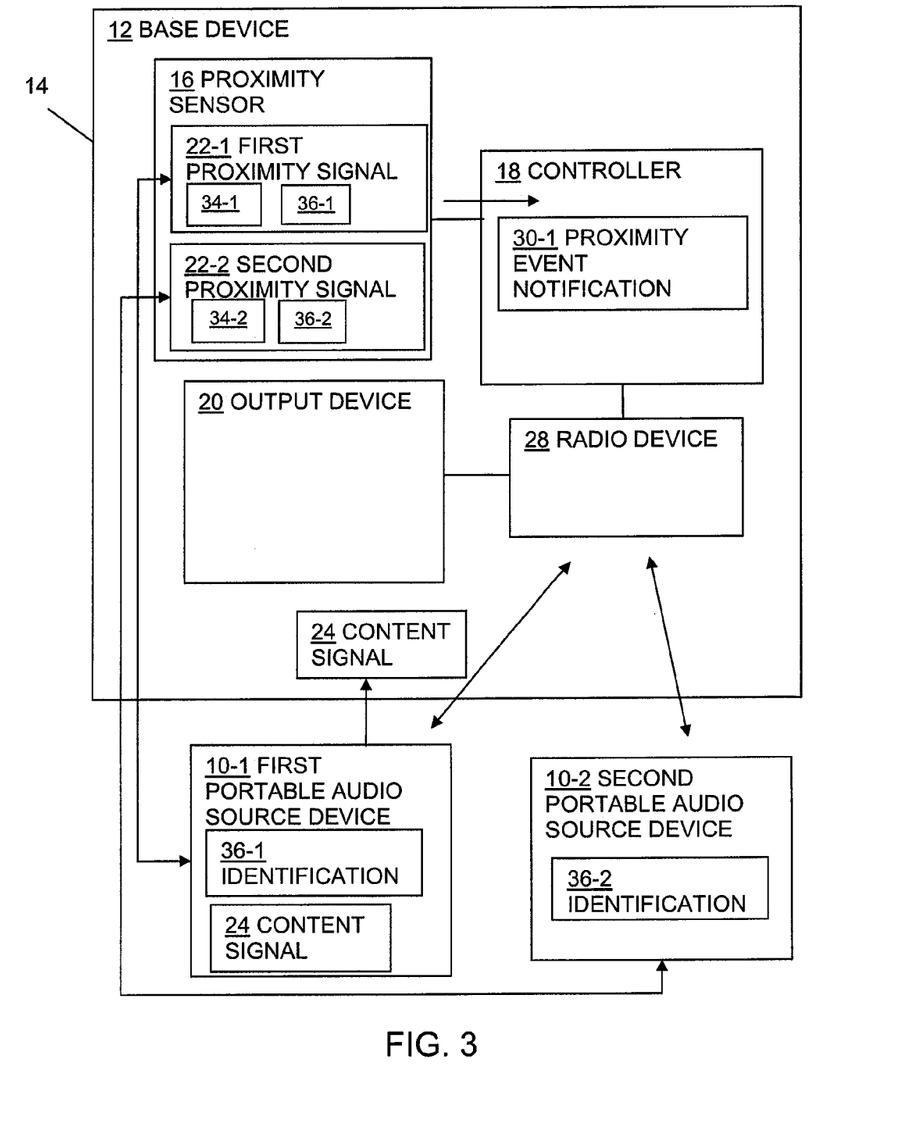
FIG. 3 illustrates a schematic representation of a base device for a portable source device, according to one arrangement.

In one arrangement, with reference to FIG. 3, the base device 12 is configured to discriminate between a first and second portable source device 10-1, 10-2 based upon the signal strength values 34 associated with the respective proximity signals 22-1, 22-2. For example, as a user brings the first portable source device 10-1 into proximity with the base device 12, the first portable source device 10-1 transmits a proximity signal 22-1 having a first signal strength value 34-1 and as a user brings the second portable source device 10-2 into proximity with the base device 12, the second portable source device 10-2 transmits a proximity signal 22-2 having a second signal strength value 34-2. In response to receiving the proximity signals 22-1, 22-2, the proximity sensor 16 compares the signal strength value 34-1 associated with the first proximity signal 22-1 with the signal strength value 34-2 associated with the second proximity signal 22-2. In the case where one signal strength value is larger than the other, the proximity sensor 16 detects the originating device having the larger signal strength value 34 as being in relatively closer proximity to the base device 12. Accordingly if the first signal strength value 34-1 is larger than the second signal strength value 34-2, the proximity sensor 16 can detect the first portable source device 10-1 as being the relatively closer portable audio source. As a result, the proximity sensor 16 generates a proximity event notification 30-1 for the controller to establish connection with the first portable source device 10-1.

In one arrangement, with continued reference to FIG. 3, the base device 12 is configured to discriminate between a first and second portable source device 10-1, 10-2 based upon the device identifier 36, such as a model number or serial number, associated with the respective proximity signals 22-1, 22-2. For example, as a user brings the first portable source device 10-1 into proximity with the base device 12, the first portable source device 10-1 transmits a proximity signal 22-1 having a first device identifier 36-1 and as a user brings the second portable source device 10-2 into proximity with the base device 12, the second portable source device 10-2 transmits a proximity signal 22-2 having a second device identifier 36-2. In response to receiving the proximity signals 22-1, 22-2, the proximity sensor 16 detects the first device identifier 36-1 associated with the first proximity signal 22-1 and the second device identifier 36-2 associated with the second proximity signal 22-2 and can compare the first and second device identifiers 36-1, 36-2 with a device identifier database (not shown). For example, the device identifier database can include a list of allowable or acceptable devices 10 with which the base device 12 can establish a wireless communication link 26. Based upon detecting a match between one of the device identifiers 36 and a database entry, such as the first portable source device 10-1, the proximity sensor 16 can generate the proximity event notification 30-1 for the controller 18 to establish a wireless communication link 26 with the identified first portable audio source 10-1. Alternately, the proximity sensor 16 can withhold generation of the proximity event notification 30 by detecting the device identifier 36 as originating from an excluded device 10 (i.e., a device 10 not included in the device identifier database.)

At some point during operation of the audio system 5, a user can remove the portable source device 10 from proximity to the base device 12. Depending upon the configuration of the proximity sensor 16, the base device 12 can either maintain or terminate the wireless connection 26 with the portable source device 10.

Figure 4:
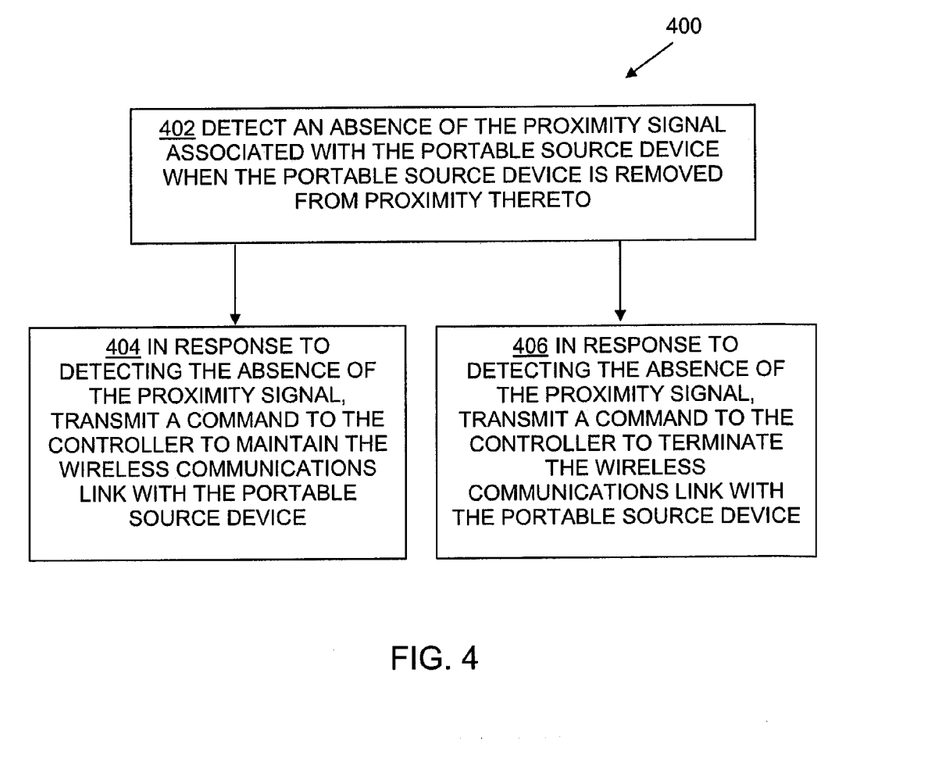
FIG. 4 is a flowchart illustrating a process conducted by the base device of FIG. 1, according to one arrangement.

In one arrangement, as indicated in the flowchart 400 of FIG. 4, in step 402 the proximity sensor 16 is configured to detect an absence of the proximity signal 22 associated with the portable source device 10 when the portable source device 10 is removed from proximity thereto. For example, assume the portable source device 10 transmits the proximity signal 22 in a substantially constant manner. When a user moves the portable source device 10 out of the reception range of the proximity sensor 16, such as out of the stand 15, while the portable source device 10 can continue to transmit the proximity signal 22, the proximity sensor 16 will not receive the signal 22. In certain cases, shown in step 404, in response to detecting the absence of the proximity signal 22, the proximity sensor 16 transmits a command to the controller 18 to maintain the wireless communication link 26 with the portable source device 10. In this case, the radio device 28 is configured to continue to receive the content signal 24 from the portable source device 10 and to provide the content signal 24 to the output device 20. Alternately, as shown in step 406, in response to detecting the absence of the proximity signal 22, the proximity sensor 16 transmits a command to the controller 18 to terminate the wireless communication link 26 with the portable source device 10. In this case, the radio device 28 is configured to provide communication to the portable source device 10 to terminate the wireless communication link 26. Once terminated, any additional content signals 24 provided by the portable source device 10 are not received and provided to the output device 20.

While various embodiments of the innovation have been particularly shown and described, it will be understood by those skilled in the art that various changes in form and details may be made therein without departing from the spirit and scope of the innovation as defined by the appended claims.

For example, as indicated above the base device 12 includes a controller 18 and a radio device 28 as distinct components. Such indication is by way of example, only. In one arrangement, the controller 18 and radio device 28 can be integrally formed as a single unit.

As indicated above, the portable source device 10 is configured to provide a content signal 24, such as an audio signal or video signal, to the base device 12. Such indication is by way of example only. In one arrangement, the portable source device 10 is configured to provide a variety of content signals to the base device 12, such as audio and video composite signals to the base device 12. In turn, it should be understood that the base device 12 is configured to output these content signals (audio and/or video signals) to an end user.

As indicated above, the base device 12 is configured to discriminate between a first and second portable source device 10-1, 10-2 based upon the device identifier 36, such as a model number or serial number, associated with the respective proximity signals 22-1, 22-2. In one arrangement, the base device 12 can also utilize the device identifier 36 to distinguish a proximity event as originating from a portable source device 10, rather than from another object. For example, assume the case where the proximity sensor 16 is configured as controller (e.g., a processor and memory) utilized in conjunction with an electromechanical device, such as physical switch or a pressure sensor. In the event a user were to dispose an object, such as a magazine or book, on the physical switch or pressure sensor, the sensor would generates an erroneous proximity event notification 30 and the base device 12 would attempt to initiate the wireless communication link 26 with the object. To minimize such erroneous activation of the base device 12, the proximity sensor 16 is configured to detect the presence of a device identifier 36 associated with the proximity signal 22 prior to generating the proximity event notification 30. Accordingly, in the case where a user disposed an object, such as a magazine or book, on the physical switch or pressure sensor, because the object does not include an associated device identifier 36 for inclusion as part of the proximity signal 22, the proximity sensor 16 can refrain from generating and transmitting a proximity event notification to the controller 18.

What is claimed is:

1. A base device for a portable source device, comprising:
an output device;
a proximity sensor configured to receive a proximity signal associated with the portable source device when the portable source device is disposed in proximity to the base device, and generate a proximity event notification in response to receiving the proximity signal; and
a controller disposed in electrical communication with the proximity sensor, the controller configured to receive the proximity event notification from the proximity sensor, and in response transmit a command signal to the portable source device, the command signal operable to configure the portable source device to automatically send a content signal via a wireless communication link, where the content signal is provided to the output device;
wherein the proximity sensor is further configured to detect an absence of the proximity signal associated with the portable source device when the portable source device is removed from proximity to the base device, and in response to detecting the absence of the proximity signal, transmit a command to the controller to maintain the wireless communication link with the portable source device so that the content signal from the portable source device continues to be provided to the output device after the portable source device has been removed from proximity to the proximity sensor.

2. The base device of claim 1, wherein the command signal is further operable to configure the portable source device to automatically establish the wireless communication link with the base device.

3. The base device of claim 1, further comprising a radio device disposed in electrical communication with the output device, the radio device configured to establish the wireless communication link between the output device and the portable source device.

4. The base device of claim 3, wherein the radio device is configured to automatically establish a Bluetooth communication link between the output device and the portable source device.

5. The base device of claim 3, wherein the radio device is configured to automatically establish Wi-Fi communication as the wireless communication link between the output device and the portable source device.

6. The base device of claim 1, wherein the proximity sensor is configured to detect a proximity signal criterion of the proximity signal when the portable source device is disposed in proximity thereto.

7. The base device of claim 1, wherein the proximity sensor is configured (i) to receive a first proximity signal associated with a first portable source device when the first portable source device is disposed in proximity thereto and to receive a second proximity signal associated with a second portable source device when the second portable source device is disposed in proximity thereto and (ii) to generate a single proximity event notification associated with only one of the first portable source device and the second portable source device, wherein the single proximity event notification is based upon one of the first proximity signal and the second proximity signal.

8. The base device of claim 7, wherein in response to receiving the first proximity signal and the second proximity signal, the proximity sensor is configured to:
 compare a signal strength value associated with the first proximity signal with a signal strength value associated with the second proximity signal to detect one of the first portable audio source and the second portable audio source as being in relatively closer proximity to the base device; and
 generate the single proximity event notification for the controller to establish connection with the relatively closer portable audio source.

9. The base device of claim 7, wherein in response to receiving the first proximity signal and the second proximity signal, the proximity sensor is configured to:
 detect a device identifier of a first portable audio source based upon the first proximity signal and detect a device identifier of a second portable audio source based upon the second proximity signal; and
 generate the single proximity event notification for the controller to establish connection with one of the first portable audio source and the second portable audio source based upon the detected identity of the first portable audio source and the detected identity of the second portable audio source.

10. The base device of claim 1, wherein the proximity sensor comprises at least one proximity sensor selected from the group consisting of a physical switch, a pressure sensor, an infrared (IR) sensor, a weight sensor, a near field communication (NFC) mechanism, a radio frequency identification (RFID) mechanism, and a signal strength detector.

11. The base device of claim 1, wherein the output device is configured as an electrical output device.

12. The base device of claim 1, wherein the output device is configured as an acoustic output device.

13. The base device of claim 1, wherein the proximity sensor is further configured to:
 detect an absence of the proximity signal associated with the portable source device when the portable source device is removed from proximity thereto; and
 in response to detecting the absence of the proximity signal, transmit a command to the controller to terminate the wireless communication link with the portable source device.

14. The base device of claim 1, further comprising:
 an enclosure configured to contain the output device, proximity sensor, and controller.

15. The base device of claim 14, comprising a stand associated with the enclosure, the stand configured to physically support the portable source device.

16. The base device of claim 15, wherein the enclosure further comprises a charging apparatus configured to charge the portable audio device when disposed in proximity thereto.

17. A base device for a portable audio source device, comprising:
 an enclosure;
 an audio output device located within the enclosure;
 a radio device located within the enclosure and disposed in electrical communication with the audio output device, the radio device configured to establish a wireless communication link between the audio output device and the portable audio source;
 a proximity sensor located within the enclosure and configured to receive a proximity signal associated with the portable audio source device when the portable audio source device is disposed in proximity to the base device, and generate a proximity event notification in response to receiving the proximity signal; and
 a controller within the enclosure and disposed in electrical communication with the proximity sensor, the controller configured to receive the proximity event notification from the proximity sensor, and in response transmit a command signal to the portable audio source device, the command signal operable to configure the portable audio source device to automatically send an audio signal via a wireless communication link, where the audio signal is provided to the audio output device;
 wherein the proximity sensor is further configured to detect an absence of the proximity signal associated with the portable audio source device when the portable audio source device is removed from proximity to the base device, and in response to detecting the absence of the proximity signal, transmit a command to the controller to maintain the wireless communication link with the portable audio source device so that the audio signal from the portable audio source device continues to be provided to the audio output device after the portable audio source device has been removed from proximity to the proximity sensor.

18. The base device of claim 17, wherein the command signal is further operable to configure the portable audio source device to automatically establish the wireless communication link with the radio device.

19. The base device of claim 17, wherein the proximity sensor is configured to detect a proximity signal criterion of the proximity signal when the portable audio source device is disposed in proximity thereto.

20. The base device of claim 17, wherein the proximity sensor is configured (i) to receive a first proximity signal associated with a first portable audio source device when the first portable audio source device is disposed in proximity thereto and to receive a second proximity signal associated with a second portable audio source device when the second portable audio source device is disposed in proximity thereto and (ii) to generate a single proximity event notification associated with only one of the first portable audio source device and the second portable audio source device, wherein the single proximity event notification is based upon one of the first proximity signal and the second proximity signal.

21. The base device of claim 20, wherein in response to receiving the first proximity signal and the second proximity signal, the proximity sensor is configured to:
compare a signal strength value associated with the first proximity signal with a signal strength value associated with the second proximity signal to detect one of the first portable audio source and the second portable audio source as being in relatively closer proximity to the base device; and
generate the single proximity event notification for the controller to establish connection with the relatively closer portable audio source.

22. The base device of claim 20, wherein in response to receiving the first proximity signal and the second proximity signal, the proximity sensor is configured to:
detect a device identifier of a first portable audio source based upon the first proximity signal and detect a device identifier of a second portable audio source based upon the second proximity signal;
generate the single proximity event notification for the controller to establish connection with one of the first portable audio source and the second portable audio source based upon the detected identity of the first portable audio source and the detected identity of the second portable audio source.

23. The base device of claim 17, wherein the proximity sensor is further configured to:
detect an absence of the proximity signal associated with the portable audio source device when the portable audio source device is removed from proximity thereto; and
in response to detecting the absence of the proximity signal, transmit a command to the controller to terminate the wireless communication link with the portable audio source device.

24. The base device of claim 17, wherein the enclosure further comprises a charging apparatus configured to charge the portable audio device when disposed in proximity thereto.

25. In a base device, a method for outputting, with an output device, a content signal received from a portable source device, comprising:
receiving, by the base device, a proximity signal associated with the portable source device when the portable source device is disposed in proximity to the base device;
detecting, by the base device, a proximity event notification in response to receiving the proximity signal;
in response to detecting the proximity event notification, transmitting, by the base device, a command signal to the portable source device, the command signal operable to configure the portable source device to automatically send the content signal to the base device via a wireless communication link, where the content signal is provided to the output device;
detecting, by a proximity sensor of the base device, an absence of the proximity signal associated with the portable source device when the portable source device is removed from proximity to the base device; and
in response to detecting the absence of the proximity signal, maintaining the wireless communication link between the base device and the portable source device by a command transmitted by the proximity sensor, so that the content signal from the portable source device continues to be provided to the output device after the portable source device has been removed from proximity to the base device.

* * * * *